United States Patent [19]

Hansen

[11] Patent Number: 4,709,902
[45] Date of Patent: Dec. 1, 1987

[54] BALL VALVE HAVING VALVE HOUSING WITH INTERIOR ANNULAR RIDGE FOR HOLDING ANNULAR RETAINING ELEMENT IN POSITION

[75] Inventor: Anders N. Hansen, Husby, Denmark

[73] Assignee: Broen Armatur A/S, Assens, Denmark

[21] Appl. No.: 845,702

[22] PCT Filed: Jul. 10, 1985

[86] PCT No.: PCT/DK85/00067
§ 371 Date: Mar. 5, 1986
§ 102(e) Date: Mar. 5, 1987

[87] PCT Pub. No.: WO86/00680
PCT Pub. Date: Jan. 30, 1986

[30] Foreign Application Priority Data

Jul. 11, 1984 [DK] Denmark ............................ 3418/84

[51] Int. Cl.[4] .............................................. F16K 5/20
[52] U.S. Cl. ..................................... 251/315; 251/317
[58] Field of Search ............... 251/315, 314, 365, 904, 251/317; 137/315; 277/166, 178, 183, 186, 189

[56] References Cited

U.S. PATENT DOCUMENTS

| 3,669,406 | 6/1972 | Moore | 251/317 X |
| 4,023,773 | 5/1977 | Wise | 251/315 |
| 4,314,586 | 2/1982 | Folkman | 251/904 |
| 4,449,694 | 5/1984 | Hobart et al. | 251/315 |
| 4,467,823 | 8/1984 | Shaffer et al. | 251/315 |
| 4,531,710 | 7/1985 | Tort | 251/365 |

Primary Examiner—Robert G. Nilson
Attorney, Agent, or Firm—Watson, Cole, Grindle & Watson

[57] ABSTRACT

The valve member (8) of a ball valve is retained in the valve housing (1) of the valve between an annular seal (21) and an annular retainer (22) which is mounted through one of the branches of the valve housing. The annular retainer (22) is secured in the valve housing (1) by being pressed into said housing and in the valve housing projecting means (23) are provided for engaging the annular retainer. A well defined and optimum sealing pressure is achieved between the valve member (8) and the annular seal (21). According to a method of mounting the valve, the retainer is pressed through a branch and beyond projecting engagement means until the pressing-in force reaches a predetermined value corresponding to the sealing pressure aimed at.

3 Claims, 5 Drawing Figures

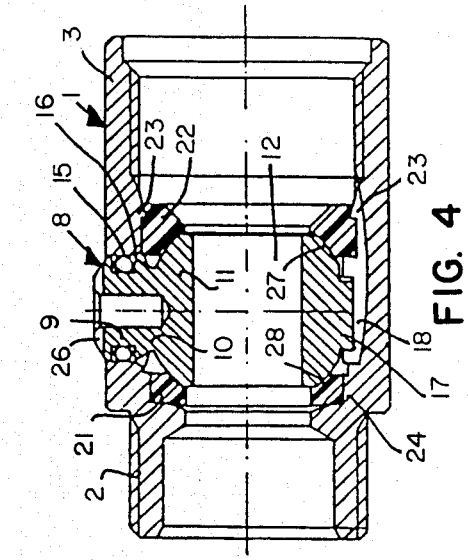
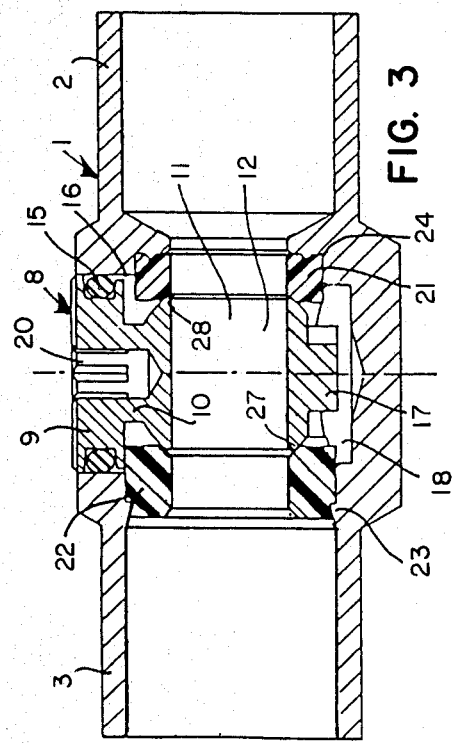
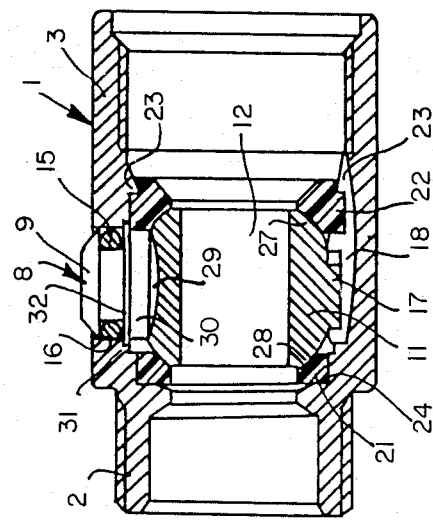

BALL VALVE HAVING VALVE HOUSING WITH INTERIOR ANNULAR RIDGE FOR HOLDING ANNULAR RETAINING ELEMENT IN POSITION

BACKGROUND OF THE INVENTION

1. Field of the Invention

This invention relates to a ball valve of the kind comprising a valve housing in which the valve member of the valve housing is retained between an annular sealing member and an annular retaining element mounted through one of the connecting branches of the valve housing.

2. The Prior Art

Ball valves of the kind referred to above are known wherein the annular retaining element is screwed into contact against the valve member so as to press the valve member against the annular sealing member with a sealing pressure. However, in the previously known ball valves of this kind it has proved to be difficult to obtain the optimum sealing pressure between the annular sealing member and the valve member. It has been proposed to provide the annular retaining element and the valve housing with cooperating abutments which engage upon termination of the screwing-in of the annular retaining element, whereby it should be possible to obtain a well defined sealing pressure between the valve member and the annular sealing member. However, due to unavoidable tolerance variations during the manufacturing of the valves, it is not possible by means of such a valve to secure an optimum sealing pressure.

As regards the prior art reference is also made to U.S. Pat. No. 2,373,628 wherein from which a ball valve is known, the seats consist of rings of molded elastomeric material. In each seat ring a spring insert is embedded having radially projecting fingers. When mounting the seat rings, the fingers are arranged with snap-action in circumferentially extending grooves in the valve housing. However, also in this case tolerance variations during the manufacturing of the valves will cause unequal sealing pressures between the valve member and the seat rings.

SUMMARY OF THE INVENTION

The ball valve according to the present invention is characterized by the annular retaining element being secured in the valve housing by being pressed into the housing and by projecting means being provided in the valve housing for engaging the annular retaining element. Hereby a very well defined pressure of abutment is achieved between the valve member and the annular sealing member which is independent of tolerance variations from valve to valve. When the annular retaining element is pressed into the valve housing until next line the force with which the pressing is carried out has achieved a predetermined value, the annular retaining element will maintain the valve member pressed against the annular sealing member with a well defined pressure of abutment, and accordingly the optimum sealing pressure between the valve member and the annular sealing member may be achieved.

Preferably, according to the invention the projecting means comprise a circumferentially extending ridge, seeing that such a ridge is easily manufactured, e.g., by turning.

In order to facilitate the pressing of the annular retaining element into the valve housing the ridge preferably according to the invention comprises a sloping surface facing away from the valve member and a steep surface facing the valve member. The latter surface will secure the retaining element in the pressed-in position.

According to a further embodiment of the invention the steep surface may be positioned in a plane, which extends perpendicular to the axis of the annular retaining element. Thereby a particularly well defined securing of the retaining element is obtained.

Preferably, according to the invention the ridge has a sharp edge in order to secure immobility of the retaining element after the pressing-in thereof.

A further embodiment of the invention is characterized by the annular retaining element consisting of a single piece of a comparatively hard material, e.g., a mixture of sulphonated plastic and teflon reinforced by fibers. Due to the manufacturing of the retaining element in one piece, a simple embodiment is obtained and a material of the kind referred to or a corresponding kind has proved to be appropriate due to the fact that such material has a somewhat "slippery" character, and accordingly offers only a small resistance during the pressing-in of the retaining element.

The invention also relates to a method of mounting a ball valve comprising a valve housing, wherein the valve member of the valve is retained between an annular sealing member and an annular retaining element which is introduced through one of the branches of the valve. According to the present invention the retaining element is pressed through the branch beyond projecting engagement means until the pressing force reaches a predetermined value corresponding to the sealing pressure aimed at.

The invention will hereinafter be further explained with reference to the drawings

DESCRIPTION OF THE DRAWINGS

FIG. 3 shows a picture corresponding to FIG. 1, but without pipe pieces, FIG. 4 shows an axially extending cross section of another embodiment of the ball valve according to the invention, and FIG. 5 shows an axially extending cross section of a still further embodiment of the ball valve according to the invention.

DETAILED DESCRIPTION OF THE PREFERRED EMBODIMENTS

Figure 2:
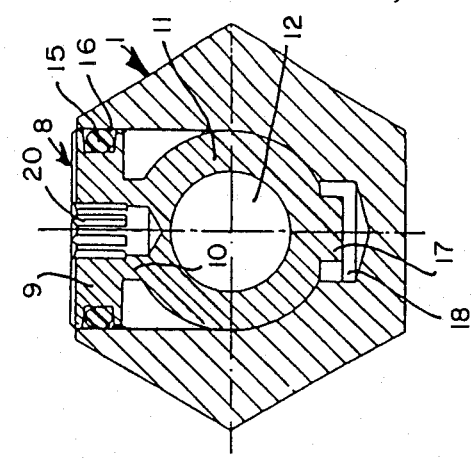
FIG. 2 shows a section according to section line ll—ll in FIG. 1.

In the drawing, 1 designates the housing of the valve shown. The housing is manufactured from a hexagonal bar, and is provided with two branches 2 and 3 which, according to the embodiment illustrated in FIGS. 1-3, have smooth inner surfaces for soldering pieces of pipes 5 and 6, which as mentioned have been omitted in FIG. 3. The diameters of the passageways in the two branches 2 and 3 can be seen to be essentially the same.

The valve plug or member of the ball valve is provided with the reference numeral 8 and consists of a head 9 which, by means of a neck 10, is connected with a generally spherical part 11 according to the embodiments illustrated in FIGS. 1-4. In the spherical part 11 a flow passage 12 is provided and, accordingly, it will be seen that the valves have been shown in their open position.

The head 9 is by means of a O-ring 15 sealed with respect to a side opening in the valve housing 1, the wall of the side opening being provided with the reference numeral 16. According to the embodiment illustrated in FIGS. 1-3, this opening has such a size that the spherical part 11 may pass through the opening, and the head 10 has a corresponding size. Thereby the valve member which is made in one piece may be mounted by being inserted through the side opening.

At the end of the valve member 8 facing away from the head 9 a projection 17 shaped as a convex lens is provided, the projection 17 extending into a recess 18 in the valve housing. The projection 17 and the recess 18 are shaped in such a way that they allow a rotation of the valve member 8 from the open position illustrated on the drawing and to closed position, viz. rotated 90° with respect to the position shown. Accordingly, the projection 17 and the recess 18 form end stops for the movement of the valve member. A blind hole 20 having engagement surfaces for a correspondingly shaped tool is provided in the head 9 for rotating the valve member.

The valve member 8 is retained in the valve housing between an annular sealing member 21 and an annular retaining element 22. The sealing member 21 is positioned in a recess 24 which faces towards the valve member 8. The retaining element 22 is pressed into the valve housing, viz. in the case concerned through the branch 3.

In order to secure the annular retaining element 22 after the pressing-in thereof, the valve housing is internally provided with projecting means which according to the embodiments shown on the drawing are shaped as a ridge 23. The surface of the ridge 23 facing away from the valve member 8 slopes conically outwardly in direction away from the valve member 8 whereby the pressing-in of the annular retaining element 22 is facilitated. The surface of the ridge 23 facing towards the valve member 8, on the contrary, is steep and extends according to the embodiment shown on the drawing in a plane extending perpendicular to the axis of the annular retaining element 22. Thereby the retaining element is secured in the inserted position thereof, because the ridge 23, as seen in cross section, acts as a pawl or as a barb. The securing of the retaining element 22 is according to the embodiment illustrated further supported in that the ridge 23 has a sharp edge.

Figure 1:
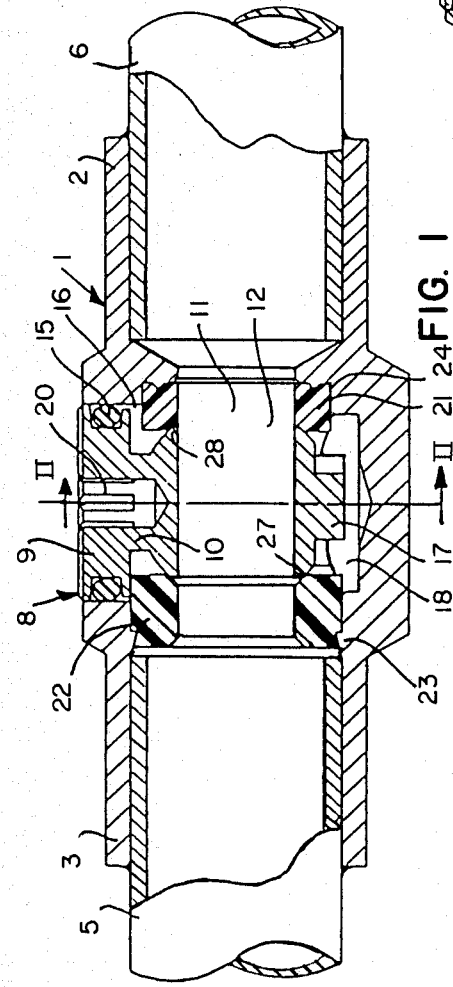
FIG. 1 shows an axially extending section through an embodiment of the ball valve according to the invention having branches with soldered pipe pieces.

In FIG. 4 the same reference numerals are used for the embodiment illustrated therein as in FIGS. 1-3 in all instances where the same or equivalent parts are concerned.

It will be seen that the differences between the embodiment according to FIG. 4 and the embodiment according to FIGS. 1-3 generally consists in that the valve member 8 in FIG. 4 is provided with a head 9 having a considerably shorter radius than the spherical part 11, viz. in such a way that the valve member, after the mounting of the annular sealing member 21 but before the pressing-in of the annular retaining element 22, may be mounted through the branch 3 with the head pointing forward, whereafter the valve member may be arranged in the final position by rotating the valve member and simultaneously inserting the head into the side opening 16 from the inside. Moreover, the branches 2 and 3 are according to FIG. 4 provided with threads, viz. one external and one internal thread. However, it will be understood that any other sort of thread combination may be used. Furthermore, the head 9 of the valve member 8 in FIG. 4 is provided with a notch 26 for engaging a screw driver for rotating the valve member.

For the embodiment illustrated in FIG. 5 the same reference numerals have been used as in FIG. 4 as regards all the instances where similar or equivalent parts are concerned.

It will be seen that the differneces between the embodiments according to FIGS. 5 and 4 generally consist in that the valve member 8 in FIG. 5 consists of two parts, viz. the head 9 and the spherical part 11 which in the mounted condition of the valve are mutually connected in a non-rotatable way, seeing that a notch 29 is provided in the spherical part 11, wherein a rib 30 on the lower surface of the head 9 engages. Moreover, along the internal end of the side opening 16 a recess 31 is provided, and the head 9 is at its lower side provided with a corresponding shoulder 32 which engages the recess and, accordingly, prevents the head 9 from slipping out of the side opening 16. According to this embodiment the head 9 is mounted from the interior in the side opening 16 after having been moved throught one of the branches and is arranged with the rib 30 extending parallel with the longitudinal direction of the valve before the mounting of the retaining element 22. Then the spherical part 11 is inserted through the branch 3 with the notch 29 extending parallel with the longitudinal axis of the valve until abutment against the sealing member 21 is obtained, and with the notch 29 engaging the rib 30. Then the annular retaining element 22 is mounted.

According to the embodiments illustrated on the drawing the annular retaining element 22 consists of a single part and is produced from a comparatively hard material, but however, not harder than the material allows the deformation necessary for the pressing-in of the retaining element. As an example of a material suitable for the retaining element 22, a mixture of a sulphonated plastic and teflon reinforced by means of fibers may be mentioned. However, it will be understood that many other materials may be used having generally corresponding conditions.

The valves shown on the drawing are mounted in the following way:

After the positioning of the valve member 8 in the valve housing 1 the annular retaining element 22 is inserted through the branch 3 until the side of the retaining element facing towards the valve member 8 abuts the ridge 23. Now a certain pressing force will be necessary in order to press said side of the retaining element beyond the ridge 23. The force necessary in order to press said surface or the front surface of the retaining element 22 beyond the ridge 23 is very well defined because both the ridge 23 and the outer surface of the retaining element 22 which is cylindrical, may be produced within very narrow tolerances. By further pressing-in of the retaining element 22, a seat 27 on the retaining element will contact the spherical part 11 and press the opposite side thereof into contact with a seat 28 on the sealing member 21. Now the resistance against the pressing-in of the retaining element 22 will increase, viz. proportionally with the increase of the contact pressure between the valve member and the sealing member 21. Empirically a final force for pressing in the retaining element may now be determined which results in an optimum sealing pressure between the valve member 8 and the sealing member 21 without clamping the valve member too hard, and when this pressing-in force is achieved the pressing-in is stopped. This sealing pressure will be independent of whether small differences exist from valve to valve due to the tolerances used during the manufacturing, e.g., as regards the distance from the recess 24 and to the ridge 23, the axial thickness of the sealing member 21, the diameter of the spherical part 11 and the length of the part of the retaining element 22 which has been pressed beyond the ridge 23. Moreover, due to the fact that the force necessary in order to press the retaining element 22 past the ridge 23, as explained previously, generally will be constant from valve to valve, the ratio of the final pressing force applied to the retaining element 22 to the final sealing pressure between the valve member 8 and the sealing member 21 will be well defined.

I claim:

1. A ball valve which comprises
   a valve housing which defines opposite first and second hollow branches and an internal recess therebetween, said first hollow branch including ridge means extending interiorly thereof,
   an annular sealing element, said annular sealing element being located in said recess adjacent said second hollow branch,
   a rotatable valve plug which includes a generally spherical part having a flow passage therethrough, said rotatable valve plug being located in said recess such that said generally spherical part contacts said annular sealing element, and
   an annular retaining element which is positioned in said first hollow branch and extends past said ridge means into said recess to apply pressure against the generally cylindrical part of said rotatable valve plug, said annular retaining element being made of a sufficiently resilient material that its outer surface, which is cylindrical in shape when in an unstressed condition, is inwardly deformed by said ridge means and thus held in position against said rotatable valve plug.

2. The ball valve as defined in claim 1, wherein said first hollow branch defines an imaginary axis line therethrough and wherein said ridge means has a generally triangular cross section, a first surface thereof extending radially inwardly toward said imaginary axis line and a second surface thereof extending from said first surface outwardly with respect to said imaginary central axis and in a direction away from the genarally spherical part of said rotatable valve plug.

3. The ball valve as defined in claim 1, wherein the valve housing is of one-piece construction and wherein said first and second hollow branches define passageways therethrough which have essentially equal diameters.

* * * * *